Feb. 17, 1953  K. M. DAY  2,628,495
HARDNESS TESTER
Filed July 17, 1951  3 Sheets-Sheet 3
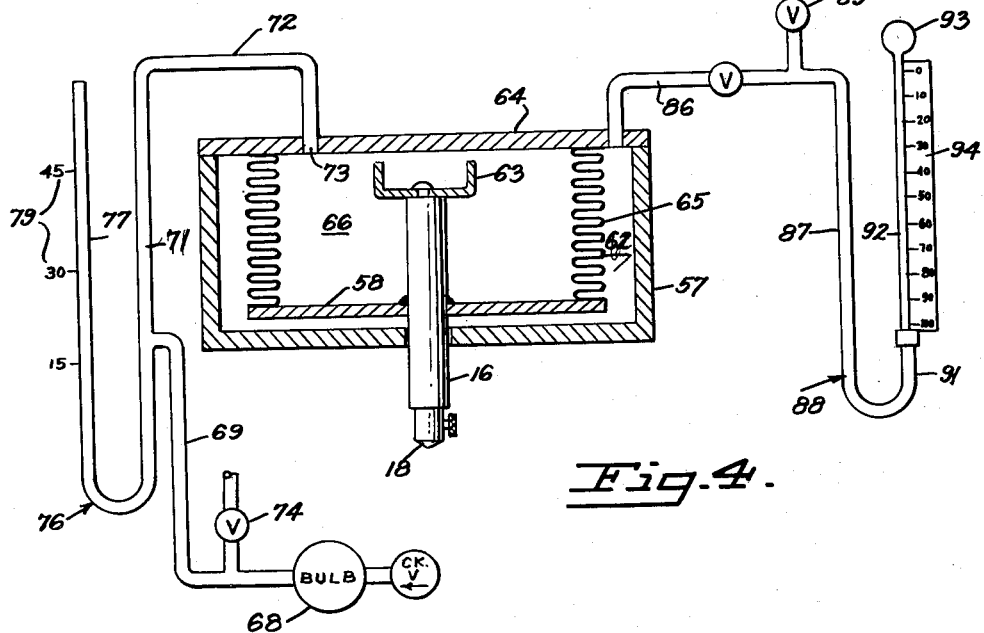
Fig. 4.
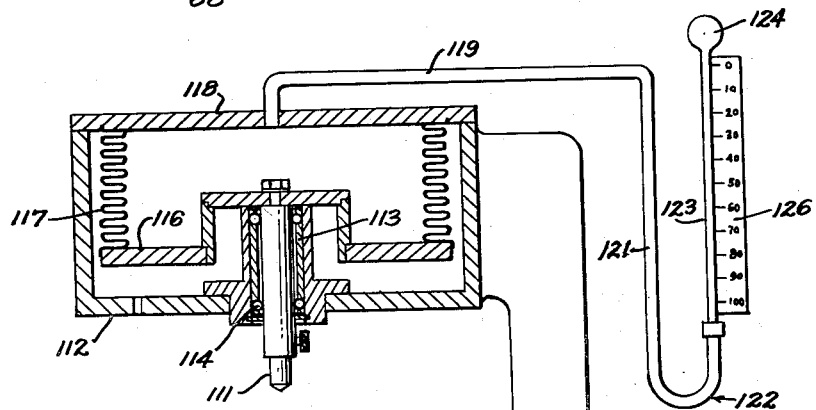
Fig. 5.
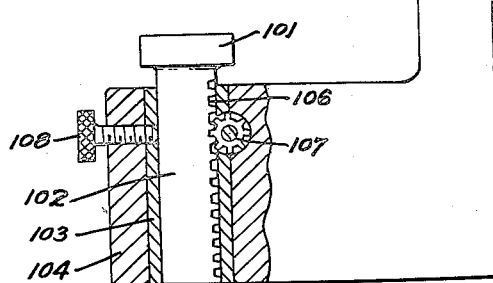
INVENTOR.
KENNEY M. DAY
BY
Meelin and Hanscom
ATTORNEYS Patented Feb. 17, 1953

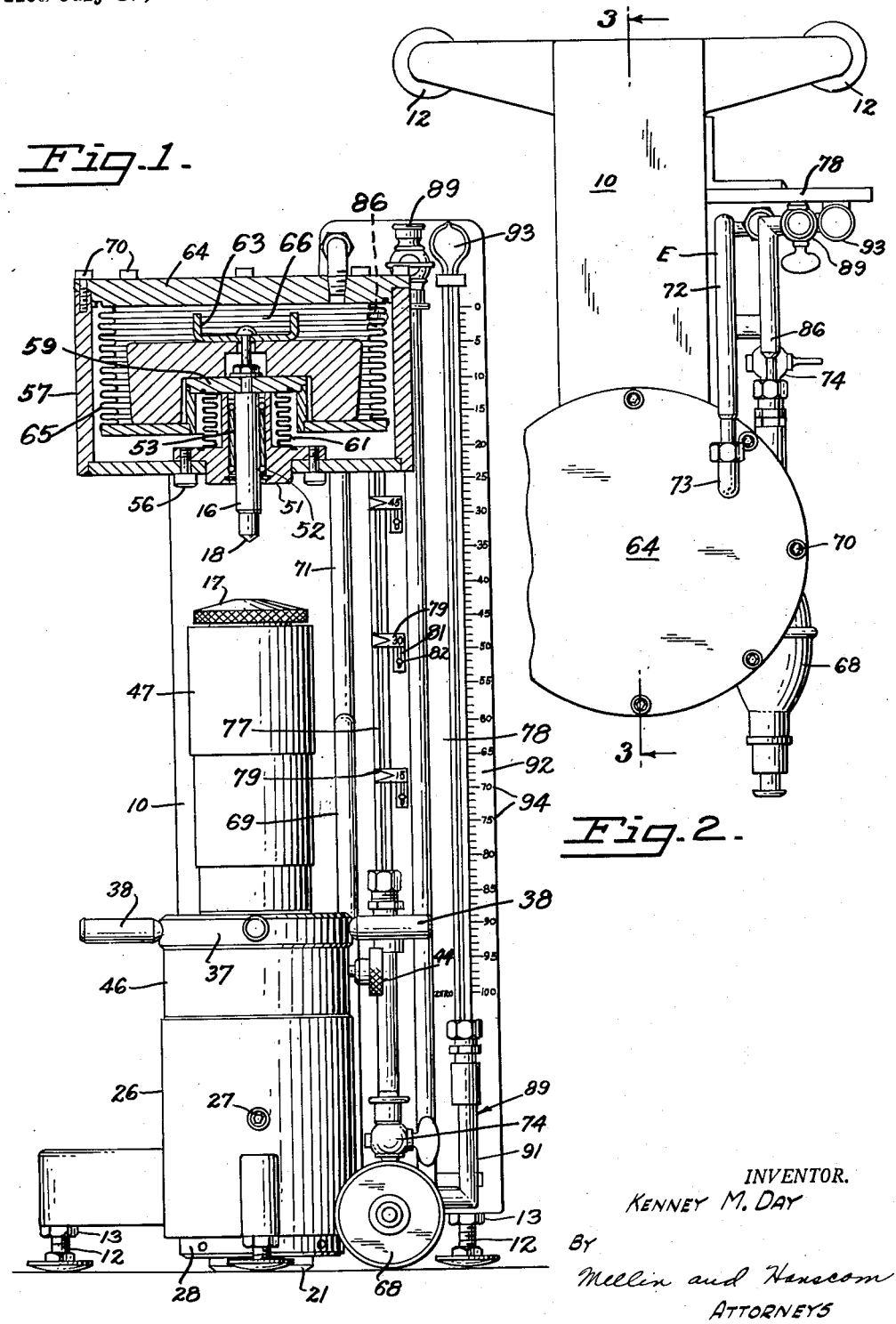

2,628,495

UNITED STATES PATENT OFFICE 2,628,495

HARDNESS TESTER

Kenney M. Day, Nevada City, Calif.

Application July 17, 1951, Serial No. 237,140

6 Claims. (Cl. 73—83)

This invention relates to new and useful improvements in hardness tester. More particularly, the invention relates to a machine for testing the hardness of the surfaces of metal and the like which differs from conventional testers in that the load which accomplishes penetration of the surface being tested is applied pneumatically by means hereinafter described in detail.

Conventional methods of testing hardness of the surface of a metal member involve the application to the surface of a penetrator of known and standard hardness greater than that of the surface being tested. A minor load is first applied which causes the penetrator to advance through the surface a minute distance. Next, a major load is applied, and the hardness of the surface is tested by observing the amount of penetration upon application of the known major load.

Conventional testers are subject to certain inaccuracies which are avoided in the practice of the instant invention. Thus, hardness testers heretofore employed are subject to frictional losses, wear of moving parts, and variations in readings due to temperature changes which affect the viscosity of lubricants and also the oil in the dash-pot commonly employed in applying the major load.

The instant machine is not subject to the inaccuracies which have been heretofore mentioned. Further, because the load is applied pneumatically, the machine is devoid of shock in that the air itself provides a cushion against shock. Loss of accuracy does not result from changes in temperature within normal ranges of room temperatures.

The measurement of penetration is accomplished hydraulically in that the penetrator is connected to a flange fixed to a bellows. The space surrounding the bellows is filled with liquid and connected to a manometer. Very slight distances of movement of the penetrator are thus magnified and readily and rapidly observed on the manometer.

The cost of construction of the instant machine is much less than that of machines heretofore produced, because of the simplification of the design of the device and reduction in number and expense of parts. The instant machine is relatively free from wear, and hence maintenance is minimized.

A modification of the instant invention relates to comparative linear measurement in such applications as the inspection of parts by gauging linear distances within tolerances. In this modification, the object to be tested is contacted by a foot attached to a flange, which flange closes off one end of a bellows. The interior of the bellows is connected to one leg of a manometer. The length of the object being measured determines the amount of expansion and contraction of the bellows, and hence the height of the liquid column in the manometer. Observation of the liquid column makes possible rapid and convenient measuring of minute distances.

Other objects of the present invention will become apparent upon reading the following specification and referring to the accompanying drawings in which similar characters of reference represent corresponding parts in each of the several views.

In the drawings:

Fig. 1 is a front elevation of the device.

Fig. 2 is a top plan thereof.

Fig. 4 is a schematic view showing the manometer connections.

Fig. 5 is a schematic view of a modification of the invention.

Figure 3:
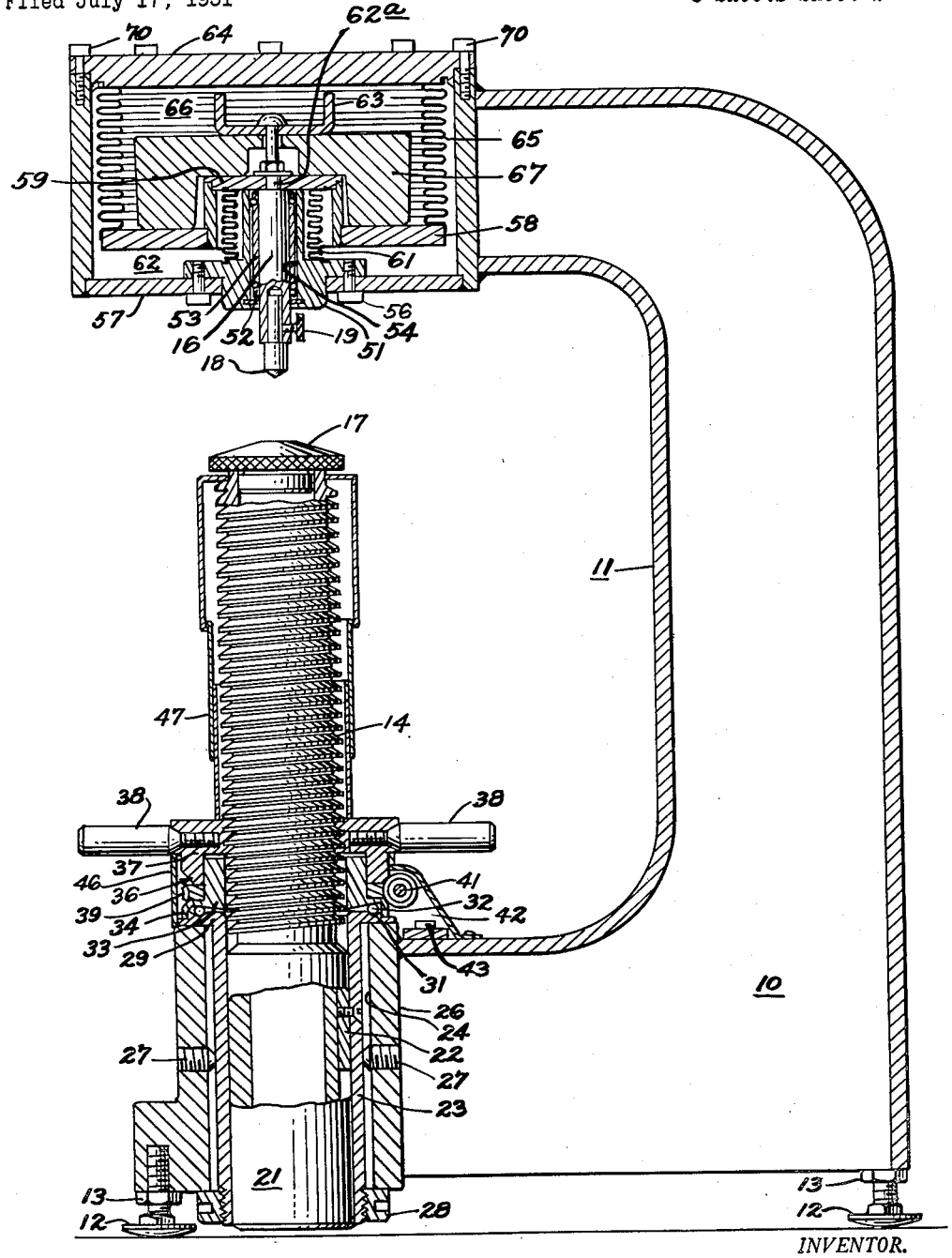
Fig. 3 is a vertical section taken substantially along the line 3—3 of Fig. 2.

The instant machine is incorporated in a frame 10 of C-shape, having a throat 11 sufficient to accommodate articles commonly subject to test. The frame is supported on three level adjusting screws 12 which are threaded into the base of the frame in a tripod arrangement, said screws being provided with lock nuts 13 to hold the screws in position after a level adjustment has been perfected.

In vertical alignment at the outer ends of the arms of the frame 10 are vertically disposed lower spindle 14 and vertically disposed upper spindle 16, the former carrying a removable anvil 17 fitted into its upper end, and the latter carrying a removable penetrator 18 held in place by set screw 19. The work-piece being tested is placed between anvil 17 and penetrator 18 for application of the testing loads. It will be understood that various shapes of anvils 17 may be employed to accommodate the shape of the work-piece and that penetrators 18 of varying shapes and hardness may be fitted into upper spindle 16.

Lower spindle 14 is made vertically adjustable so as to accommodate a wide variety of work-pieces. Accordingly, the lower end 21 of spindle 14 is keyed by means of key 22 to bushing 23, and said bushing is held against rotation within bore 24 in boss 26 formed in the front part of frame 10 by means of a plurality of set screws 27. The bottom of bushing 23 is threaded and is held against upward movement by nut 28 which bears against the bottom of boss 26, and the upper end of bushing 23 has a flange 29 which bears against the top of boss 26. Thus, it will be seen that spindle 14 may slide vertically with respect to bushing 23 and frame 10 but cannot rotate with respect thereto.

In the top surface of flange 29 is formed an annular V-shaped groove 31 in which is deposited a plurality of small balls 32, the flange 29 thus acting as a ball bearing race. The opposite race is provided by annular carrier 33 which encompasses spindle 14 and has a hardened undersurface and a down-turned rim 34 which captures the balls and prevents dislodgement.

Carrier 33 is one part of an adjustment means 36 for lower spindle 14. It will be observed that the upper two-thirds of said spindle 14 is threaded with a buttress thread of five threads to the inch, and the threaded portion is engaged by capstan nut 37, provided with a plurality of radially disposed capstan arms 38. Interposed between nut 37 and carrier 33 is worm wheel 39, the three parts, namely carrier 33, worm wheel 39, and nut 37 being fixed so that they move together. Worm wheel 39 is engaged by worm 41, horizontally mounted, said worm 41 having four threads and having a thread angle of about 18° 27', so that worm 41 and worm wheel 39 are non-locking. Housing 42 for worm 41 is secured to frame 10 by screw 43. Knob 44 is provided for manual adjustment of worm 41.

Dust cover 46 is provided about the periphery of adjustment means 36, and a second dust cover 47, telescopic in form, is provided about the upper end of spindle 14.

Rough vertical adjustment of spindle 14 is made by turning capstan nut 37 manually, in that spindle 14, being prevented from turning, is raised or elevated as said nut 37 is turned. Fine adjustment of spindle 14 is accomplished by turning knob 44 by reason of the small pitch of worm 41. Thus, the elevation of anvil 17 may be accurately controlled.

Upper spindle 16 is held in carrier 51 in such manner that it is vertically slidable but is held in vertical position. Thus, a plurality of balls 52 is provided at the upper and lower end of bushing 53, said balls 52 bearing against spindle 16 and against vertical bore 54 in carrier 51. Carrier 51 is fixed by means of screws 56 into hermetic chamber housing 57, which is in the form of a round box welded to frame 10.

Horizontal carrier flange 58 is positioned within housing 57, said flange being offset upwardly at its central portion 59 to provide clearance for carrier 51, there being a small metallic bellows 61 soldered at one end to carrier 51 and at the opposite end to offset 59 so that the distance between carrier and flange may vary but no air may escape from chamber 62 through the mounting for spindle 16.

The upper end 62a of upper spindle 16 is securely mounted in offset 59, there being an air seal to prevent passage of air through the hole receiving said end 62a. The top of upper spindle 16 is fastened to U-shaped stop member 63 which is arranged to bear against cover 64 so as to limit movement of spindle 16 to about 0.125 in. The lower limit of movement of spindle 16 is provided by flange 58 contacting carrier 51.

It will be observed, particularly with reference to Fig. 3, that large bellows 65 and carrier flange 58 divide the interior of housing 57 into two parts, an outer chamber 62 and an inner chamber 66, each hermetically sealed. Said bellows 65 is soldered at the bottom to carrier flange 58 and at the top to cover 64 so that flange 58 may rise and lower within housing 57. Within chamber 66 and bearing upon flange 58 and offset 59 is a lead weight 67 which provides the minor load upon the work-piece being tested. The major load is applied by pneumatic pressure within chamber 66, said pneumatic pressure being provided by a hand bulb 68 connected by tubes 69 and 71, horizontal connection 72 and fitting 73 which extends through cover 64 into chamber 66. An escape cock 74 is provided to exhaust said chamber 66. It will be apparent that by manipulation of bulb 68 the pressure within chamber 66 may be controlled and thereby the force exerted on penetrator 18 controlled.

The entire unit, comprising the interior of housing 57, may be removed by removing screws 56 and screws 70 holding cover 64 on housing 57.

The major load applied is measured by U-shaped manometer 76 filled with mercury. One leg of said manometer 76 is vertical tube 71, which connects through horizontal connection 72 and fitting 73 into chamber 66. The opposite leg of said manometer is vertical glass capillary tube 77 mounted on a vertical plate 78 on the back of the machine. Three indicators 79 are attached to said plate 78, their vertical position being adjustable by reason of slots 81 through which pass screws 82 threaded into plate 78. The lowermost indicator 79 is marked 15, the middle 30, and the upper 45, said indicators referring to major load expressed in kilograms.

Chamber 62 is filled with colored liquid and into said chamber 62 is connected horizontal pipe 86, which, in turn, is connected into vertical leg 87 of U-shaped manometer 88, there being preferably a cock 89 at the connection between horizontal pipe 86 and leg 87 through which the system may be kept filled with colored liquid. The opposite leg 91 of manometer 88 is provided with a vertical capillary tube 92, the upper end of which has an enlarged bulb 93. On plate 78, alongside tube 92 is a scale 94 graduated from 0 to 100, reading from top to bottom, the height of liquid in said tube 92 indicating degrees of hardness of the piece being tested. One point of hardness on scale 94 equals 0.001 mm. penetration.

Operation

After the machine has been set up and adjusted so that it is level, the work-piece to be tested is placed on anvil 17. Cock 74 is opened, exhausting chamber 66 to atmosphere. Capstan nut 37 is turned until the work-piece is in contact with penetrator 18, it being understood that anvil 17 and penetrator 18 have been selected by reason of the shape and estimated hardness of the work-piece, respectively. Capstan nut 37 is turned further and fine adjustment is also made by twisting knob 44 which turns worm 41 and thereby the minor load is applied. It will be seen that as, during this phase of the operation, penetrator 18 is raised, chamber 62 increases in volume, and as chamber 62 is increased, the height of colored liquid in capillary tube 92 is decreased; this operation being continued until the liquid drops to the bottom or 100 on scale 94.

The minor load having been applied, thereupon the major load is applied. This is accomplished by first closing cock 74 and then pumping air into chamber 66 by bulb 68 until the mercury in capillary 77 is elevated to one of the indicators 79. The particular scale selected is a matter of judgment, depending upon the hardness of material being tested. When the mercury reaches one of said indicators 79, it will be apparent that the pressure in chamber 66 has forced penetrator 18 into the workpiece with a predetermined force, the distance of penetration being a function of the hardness of the material being tested.

After the major load has been applied, cock 74 is opened and chamber 66 is exhausted. The elevation of penetrator 18 will be less than it was at commencement of the test, and the difference in elevation or amount of penetration will be observed by the reading upon scale 94 which is a direct function of the elevation of spindle 16. The harder the material, the less penetration, and hence, the higher the numerical reading of scale 94. After the reading has been made, anvil 17 is lowered and the workpiece removed.

It will be understood that where the machine is in constant use, as in large-scale testing operations, bulb 68 may be eliminated and a regulating valve connecting to a source of compressed air substituted. Further, cock 74 may be replaced by a trip valve.

A modification of the invention is illustrated schematically in Fig. 5, said modification being particularly adaptable to comparative measurement, as in inspection wherein tolerances of a plurality of parts are to be checked. An anvil 101 is provided on the upper end of spindle 102. Said spindle is slidable vertically within sleeve 103 mounted in base 104. Spindle 102 bears rack 106 which is engaged by pinion 107 mounted in said base 104. By twisting said pinion 107, by means of a knob (not shown), spindle 102 and anvil 101 may be raised or lowered. Lock 108 is provided to lock anvil 101 in position.

The work-piece being tested is mounted on anvil 101, which is adjusted and locked so that the upper end of said work-piece contacts the lower end of foot 111. Foot 111 extends inside box 112, which is rigidly mounted with respect to base 104, there being a sleeve 113 and ball bearings 114 employed as a mounting of foot 111 so that foot 111 may be freely propelled and repelled within box 112, and flange 116 closes off the lower end of bellows 117, the upper end of which is sealed to top 118. The interior of bellows 117 is filled with a colored liquid and communicates through fitting 119 with one leg 121 of U-shaped manometer 122. The other leg 123 of said manometer is a capillary tube terminating in bulb 124. Alongside said tube is fixed scale 126.

In use, anvil 101 is set at a distance below foot 111 slightly less than the length of the workpiece being tested. A standard block of exact length is first placed on said anvil 101, foot 111 being elevated thereby, and elevation of said foot 111 contracting bellows 117 and raising the colored liquid to a given reading on scale 123. Tolerances are then established on either side of the given reading. The work-pieces to be tested are placed on anvil 101, and the positioning of each work-piece, in turn, causing a certain elevation of foot 111 and thus raising the liquid in capillary tube 123 a distance dependent upon the dimension of the piece being tested. Inspection is readily and rapidly accomplished by persons even of slight skill in that those objects falling outside the tolerances established on scale 126 may be discarded.

Although the present invention has been described in some detail by way of illustration and example for purposes of clarity of understanding, it is understood that certain changes and modifications may be made within the spirit of the invention and scope of the appended claims.

I claim:

1. In a hardness tester, an anvil, a penetrator positioned above said anvil, a box above the penetrator rigidly mounted and pneumatically sealed, means for mounting the penetrator for vertical movement relative to said box, bellows means in the box connected to the penetrator and dividing the box into first and second chambers, said first chamber being a penetrator actuating chamber and the second chamber being a measuring chamber, means for supplying fluid under pressure to said first chamber to expand the same and actuate the penetrator toward the anvil, whereby the volume of said second chamber is varied, and measuring means in communication with the second chamber responsive to a change in volume thereof to give an indication of the hardness of an object into which the penetrator penetrates.

2. In a hardness tester, an anvil, a penetrator positioned above said anvil, a box above the penetrator rigidly mounted and pneumatically sealed, means for mounting the penetrator for vertical movement relative to said box, bellows means in the box connected to the penetrator and dividing the box into first and second chambers, said first chamber being a penetrator actuating chamber and the second chamber being a measuring chamber, means for supplying air under pressure to said first chamber to expand the same to actuate the penetrator, whereby the volume of the second chamber is varied, said second chamber being filled with a liquid and measuring means in communication with the second chamber for measuring the variation in volume thereof to give an indication of the hardness of the object into which the penetrator penetrates.

3. In a hardness tester, an anvil, a penetrator positioned above said anvil, a box above the penetrator rigidly mounted and pneumatically sealed, means for mounting the penetrator for vertical movement relative to said box, bellows means in the box connected to the penetrator and dividing the box into first and second chambers, said first chamber being a penetrator actuating chamber and the second chamber being a measuring chamber, means for supplying fluid under pressure to said first chamber to expand the same and actuate the penetrator toward the anvil, whereby the volume of said second chamber is varied, measuring means in communication with the second chamber responsive to a change in volume thereof to give an indication of the hardness of an object into which the penetrator penetrates, and means for elevating the anvil to bring an object thereon into contact with the penetrator to bring the measuring means, at a time prior to the supply of fluid to the first chamber, to a predetermined reading regardless of the size of the object.

4. In a hardness tester, an anvil, a penetrator positioned above said anvil, a box above the penetrator rigidly mounted and pneumatically sealed, means for mounting the penetrator for vertical movement relative to said box, bellows means in the box connected to the penetrator and dividing the box into first and second chambers, said first chamber being a penetrator actuating chamber and the second chamber being a measuring chamber, means for supplying fluid under pressure to said first chamber to expand the same and actuate the penetrator toward the anvil, whereby the volume of said second chamber is varied, measuring means in communication with the second chamber responsive to a change in volume thereof to give an indication of the hardness of an object into which the penetrator penetrates, a weight connected to the penetrator, and means for elevating the anvil to bring an object thereon into contact with the penetrator to apply a minor load to the object prior to the supply of fluid under pressure to the first chamber and to bring the measuring means to a predetermined reading regardless of the size of the object.

5. In a hardness tester, an anvil, means for elevating said anvil to desired position, a box rigidly mounted and pneumatically sealed, a penetrator disposed between the box and the anvil and movably extending into the box, a flange vertically movable in said box connected for movement with said penetrator, a bellows fixed at one end to said flange and at the opposite end to said box and dividing said box into a first chamber and a second chamber, said first chamber being arranged to be expanded by fluid pressure, means for applying fluid pressure within said chamber, means for measuring the fluid pressure in said first chamber, a manometer in fluid communication with said second chamber responsive to said movement of said penetrator and indicating the deflection of said second chamber, and a second bellows fixed at one end to said flange on the opposite side thereof from the place of attachment of the first-named bellows and at its other end to said box, and sealing off the interior of said box to the atmosphere in the zone vicinal said means for mounting said penetrator.

6. In a hardness tester, an anvil, means for elevating said anvil to desired position, a box rigidly mounted and pneumatically sealed, a penetrator disposed between the box and the anvil and movably extending into the box, a flange vertically movable in said box connected for movement with said penetrator, a bellows fixed at one end to said flange and at the opposite end to said box and dividing said box into a first chamber and a second chamber, said first chamber being arranged to be expanded by fluid pressure, means for applying fluid pressure within said chamber, means for measuring the fluid pressure in said first chamber, a manometer in fluid communication with said second chamber responsive to said movement of said penetrator and indicating the deflection of said second chamber, a second bellows fixed at one end to said flange on the opposite side thereof from the place of attachment of the first-named bellows is connected, and a carrier member detachably connected to the bottom of said box and to which the lower end of said second bellows is connected and in which said means for mounting said penetrator is mounted, said cover, said first-mentioned bellows, said flange, said second bellows, said carrier member and said penetrator being installable and removable from said box as a unit.

KENNEY M. DAY.

REFERENCES CITED

The following references are of record in the file of this patent:

UNITED STATES PATENTS

| Number | Name | Date |
| --- | --- | --- |
| 1,258,426 | Mackintosh | Mar. 5, 1918 |
| 1,320,748 | Fisher | Nov. 4, 1919 |
| 1,752,964 | Prange | Apr. 1, 1930 |
| 2,107,114 | Gogan | Feb. 1, 1938 |
| 2,452,753 | Hathaway | Nov. 2, 1948 |
| 2,498,136 | Rupley | Feb. 21, 1950 |
| 2,536,880 | James | Jan. 2, 1951 |

FOREIGN PATENTS

| Number | Country | Date |
| --- | --- | --- |
| 603,531 | Germany | Oct. 3, 1934 |